Patented Dec. 4, 1923.

1,476,381

UNITED STATES PATENT OFFICE.

HARLAN L. TRUMBULL, OF AKRON, OHIO, ASSIGNOR TO THE B. F. GOODRICH COMPANY, OF NEW YORK, N. Y., A CORPORATION OF NEW YORK.

PNEUMATIC TIRE AND METHOD OF MAKING THE SAME.

No Drawing.    Application filed February 5, 1923.   Serial No. 617,170.

*To all whom it may concern:*

Be it known that I, HARLAN L. TRUMBULL, a citizen of the United States, residing at Akron, in the county of Summit and State of Ohio, have invented a certain new and useful Pneumatic Tire and Method of Making the Same, of which the following is a specification.

This invention relates to pneumatic tires and methods of making the same, and especially tires which are vulcanized under internal pressure to cause them to expand against and thus take the form of the walls of the mold cavity, such practice being commonly employed, for example, in the manufacture of cord tires.

In pneumatic tires such as are commonly used on vehicles it is desirable that the casing be provided with a non-sticking inner surface or coating, to prevent adhesion of the tube thereto under conditions of use. To provide this, a common practice has been to paint the inner surface of the tire, after vulcanization, with a preparation, such as a suspension of finely divided mica in a rubber cement, adapted, upon drying, to form a coating which will be non-adhesive at the temperatures developed in service.

Where the tires are vulcanized under internal fluid pressure, an expansible core chiefly consisting of or comprising rubber has been used to expand the tire, and such cores, being used repeatedly in successive vulcanizing operations have deteriorated as a result of the migration of sulfur from successive tires into the walls of the core, at vulcanizing temperatures, such migration of sulfur resulting in excessive vulcanization and consequent brittleness and fracture of the material of the core. A coating of substantially sulfur-free rubber has been applied to the core to delay such deterioration, but such coating ultimately becomes excessively vulcanized, with the consequent deterioration of the core.

The chief objects of my invention are to provide an improved tire comprising an inner coating of a non-adhesive material applied prior to vulcanization, thereby making it unnecessary to paint the tire after vulcanization, and to provide an improved method of preventing the migration of sulfur from the tire to the core during vulcanization, thereby prolonging the life of the core.

I accomplish these objects by associating with the inner surface of the tire, prior to vulcanization thereof, a film comprising chlorinated rubber, rubber hydrochloride, or a derivative thereof, such film being adapted to prevent migration of sulfur and, preferably, to adhere to the tire after the vulcanization is completed. When an expansible core is used, the film-forming material may be applied, preferably in solution, to either the core or the tire, but I prefer to apply it to the tire in order to assure adhesion of the film to the tire after vulcanization, and to avoid excessive cracking of the film such as might result from the manipulation of the core in inserting it in and removing it from the tire, or from its expansion within the tire.

By way of example, I may use a solution of as much as 2 parts by weight of chlorinated rubber in 3 parts of a solvent such as benzene or carbon tetrachloride, although I have obtained better results, except in the matter of time required for drying, by using 1 part of the chlorinated rubber to 20 parts of the solvent. The solution may be applied either with a brush or by spraying, and is allowed to dry, after which the tire is vulcanized.

I have found it advisable, when rubber heptachloride, for example, is used, to add a softener therefor, such as uncured rubber, aluminum palmitate, or triacetin, to the solution, to obtain a more highly flexible film. When rubber hydrochloride, or a soft derivative of the chloride or hydrochloride, such as chlorinated rubber hydrochloride, is used, such softener is less important. The use of uncured rubber as a softener results in especially good adhesion of the film to the tire without undue adhesion of the film to the core.

As a further barrier to the migration of sulfur, and in other respects to improve the properties of the film, as in the matter of appearance and cost, I preferably add finely divided mica to the solution.

My invention as herein described is subject to modification within its scope, and I do not wholly limit my claims to the specific substances mentioned nor to the exact procedure described.

I claim:

1. A pneumatic tire comprising vulcanized rubber and a surface film thereon, said film comprising a chlorine-rubber compound.

2. A pneumatic tire comprising vulcanized rubber and a surface film thereon, said film comprising chlorinated rubber and being fixed to said tire during vulcanization.

3. A pneumatic tire comprising vulcanized rubber and a surface film thereon, said film comprising a chlorine-rubber compound and a softener therefor.

4. A pneumatic tire comprising vulcanized rubber and a surface film thereon, said film comprising a chlorine-rubber compound, and mica.

5. A pneumatic tire comprising vulcanized rubber and a surface film thereon, said film comprising a chlorine-rubber compound, a softener therefor, and mica.

6. The method of making a pneumatic tire which comprises associating with the inner surface of a prepared tire carcass a film comprising a chlorine-rubber compound, and vulcanizing the tire carcass in association with said film.

7. The method of making a pneumatic tire which comprises associating with the inner surface of a prepared tire carcass a film comprising a chlorine-rubber compound and a softener therefor, and vulcanizing the tire carcass in association with said film.

8. The method of making a pneumatic tire which comprises associating with the inner surface of a prepared tire carcass a film comprising a chlorine-rubber compound, and mica, and vulcanizing the tire carcass in association with said film.

9. The method of making a pneumatic tire which comprises painting the inner surface of a prepared tire carcass with a solution of a chlorine-rubber compound, allowing said solution to dry, and then vulcanizing said tire carcass.

10. The method of making a pneumatic tire which comprises vulcanizing the tire while expanding it against a mold by distending within it an expansible rubber core, the core and the tire being separated by a film comprising a chlorine-rubber compound.

11. The method of making a pneumatic tire which comprises vulcanizing the tire while expanding it against a mold by distending within it an expansible rubber core, the core and the tire being separated by a film comprising a chlorine-rubber compound and mica.

12. The method of making a pneumatic tire which comprises vulcanizing the tire while expanding it against a mold by distending within it an expansible rubber core, the core and the tire being separated by a film comprising a chlorine-rubber compound and a softener therefor.

13. The method of making a pneumatic tire which comprises vulcanizing the tire while expanding it against a mold by distending within it an expansible rubber core, the core and the tire being separated by a film comprising chlorinated rubber.

14. The method of making a pneumatic tire which comprises vulcanizing the tire while expanding it against a mold by distending within it an expansible rubber core, the core and the tire being separated by a film comprising chlorinated rubber and a softener therefor.

15. The method of making a pneumatic tire which comprises vulcanizing the tire while expanding it against a mold by distending within it an expansible rubber core, the core and the tire being separated by a film comprising chlorinated rubber and mica.

16. The method of making a pneumatic tire which comprises vulcanizing the tire while expanding it against a mold by distending within it an expansible rubber core, the core and the tire being separated by a film comprising a chlorine-rubber compound and raw rubber.

17. The method of making a pneumatic tire which comprises vulcanizing the tire while expanding it against a mold by distending within it an expansible rubber core, the core and the tire being separated by a film comprising chlorinated rubber and raw rubber.

18. A pneumatic tire comprising vulcanized rubber and a surface film thereon, said film comprising a chlorine-rubber compound and raw rubber.

19. A pneumatic tire comprising vulcanized rubber and a surface film thereon, said film comprising chlorinated rubber and raw rubber.

In witness whereof I have hereunto set my hand this 2nd day of February, 1923.

HARLAN L. TRUMBULL.